Patented Dec. 18, 1951

2,578,915

UNITED STATES PATENT OFFICE 2,578,915

PREPARATION OF FRUIT FLAVORS AND THE RESULTING PRODUCT

John Bartels, Dobbs Ferry, N. Y.

No Drawing. Application October 8, 1949,
Serial No. 120,410

3 Claims. (Cl. 99—193)

The present invention relates to a process and product for the preparation of fruit flavors, and more particularly citrus fruit flavors.

In the manufacture of fruit flavors in the form of powders, syrups, and the like, which may subsequently be used for the preparation of ice cream, sherbet, fruit drinks, etc., previously known processes have not made it possible to obtain a product containing the true flavor of the fresh fruit. This is believed due mainly to the rapid deterioration of the flavor of harvested fruit during processing and in transportation.

It is a general object of this invention to provide a method of maintaining the fresh fruit flavor of harvested fruit throughout processing, transportation and until final consumption.

It is a more specific object of the invention to provide a method of preparing a fruit flavor from harvested fruit shortly after harvesting and to lock the flavor therein by quick-freezing.

It is also an object of the invention to provide novel fruit flavor products.

Although it is a known fact that much of the real flavor of citrus fruit is to be found in their rinds, known fruit flavors have been prepared from the fruit juice because it has been found difficult to make the rind palatable. In accordance with my invention, I proceed to separate the rind from the pulp of the fruit shortly after harvesting, to comminute the separated rind, and to combine the comminuted rind with sugar, using, for instance, one part of rind to one part of sugar, by weight. The separation of the skin from the pulp and the comminution thereof may preferably be obtained by grating of the whole fruit. The skin-sugar mixture is then permitted to stand for about one hour, after which it is combined with the juice obtained from the fruit in any conventional manner, in the proportion of about one pound of the sugared rind to two quarts of juice. After thorough mixing, the product is quick frozen for storage and shipment. The frozen product has and retains a true fruit flavor and may be used for the preparation of fruit syrups, sherbets, ice cream and any other food desired to contain a true fruit flavor.

While the present invention has been described hereinabove in connection with a specific process, it should be understood that its scope is limited only by the following claims.

I claim:

1. A process for the preparation of a fruit flavor comprising the steps of separating shortly after harvesting the rind from the pulp of the fruit whose flavor is desired, comminuting the separated rind, combining the rind with sugar, permitting the rind-sugar mixture to be substantially integrated, combining the integrated mixture with the juice of the fruit, mixing the juice and the rind-sugar mixture thoroughly, and quick freezing the product.

2. A process for the preparation of a fruit flavor comprising the steps of grating the whole fruit whose flavor is desired shortly after harvesting, combining the grated rind with sugar, permitting the rind-sugar mixture to stand for about one hour, combining the mixture with the juice of the fruit, mixing the juice and the rind-sugar mixture thoroughly, and quick freezing the product.

3. A quick-frozen fruit flavor comprising an integrated mixture of sugar and comminuted fruit rind combined with the fruit juice in the proportion of about one pound of rind-sugar mixture to about two quarts of juice.

JOHN BARTELS.

REFERENCES CITED

The following references are of record in the file of this patent:

UNITED STATES PATENTS

| Number | Name | Date |
|---|---|---|
| 1,097,607 | Ames | May 26, 1914 |
| 1,735,118 | Kunz | Nov. 12, 1929 |
| 2,061,188 | Cowgill | Nov. 17, 1936 |